(12) United States Patent
Binns et al.

(10) Patent No.: US 9,704,512 B2
(45) Date of Patent: Jul. 11, 2017

(54) ELECTROMAGNETIC DATA STORAGE DEVICES HAVING IMPROVED MAGNETIC STRUCTURE

(71) Applicant: PEACEKEEPER (INTERNATIONAL) LTD., Stroud, Glocestershire (GB)

(72) Inventors: Christopher Binns, Stroud (GB); David Binns, Stroud (GB); John Kinmont, Stroud (GB)

(73) Assignee: Peacekeepers (International) Ltd. (GB)

( * ) Notice: Subject to any disclaimer, the term of this patent is extended or adjusted under 35 U.S.C. 154(b) by 0 days.

(21) Appl. No.: 15/037,676

(22) PCT Filed: Nov. 19, 2014

(86) PCT No.: PCT/GB2014/053412
§ 371 (c)(1),
(2) Date: May 18, 2016

(87) PCT Pub. No.: WO2015/075438
PCT Pub. Date: May 28, 2015

(65) Prior Publication Data
US 2016/0300588 A1    Oct. 13, 2016

(30) Foreign Application Priority Data
Nov. 19, 2013   (GB) .................................. 1320414.4

(51) Int. Cl.
*G11B 5/133*   (2006.01)
*G11B 5/127*   (2006.01)
(Continued)

(52) U.S. Cl.
CPC ............ *G11B 5/133* (2013.01); *G11B 5/1274* (2013.01); *G11B 5/1278* (2013.01);
(Continued)

(58) Field of Classification Search
CPC ..... G11B 5/133; G11B 5/1274; G11B 5/1278; G11B 5/3113; G11B 5/3163; G11B 5/3116; H01F 1/0063
See application file for complete search history.

(56) References Cited

U.S. PATENT DOCUMENTS 6,606,225 B1    8/2003  Funayama et al.
6,833,975 B2 *  12/2004 Fukazawa .............. B82Y 10/00
                                              360/123.05
(Continued)

FOREIGN PATENT DOCUMENTS

CN       102513719      6/2012
JP        60217604     10/1985
JP        5931894 B2    6/2016

*Primary Examiner* — Brian Miller
(74) *Attorney, Agent, or Firm* — Craig J. Lervick; Larkin Hoffman Daly & Lindgren, Ltd.

(57) ABSTRACT

The present invention relates to an electromagnetic data storage device comprising a data storage medium including a magnetic material, and a write head including an electromagnetic element operable to generate a magnetic field that impinges on a selected portion of the magnetic material of the data storage medium adjacent the write head, so as to affect the magnetization direction of the selected portion of magnetic material. The electromagnetic element includes a magnetic structure including a matrix material, and a plurality of magnetic nanoparticles held in the matrix material.

18 Claims, 8 Drawing Sheets

(51) Int. Cl.
  *H01F 1/00* (2006.01)
  *B82Y 25/00* (2011.01)
  *G11B 5/31* (2006.01)

(52) U.S. Cl.
  CPC .......... *G11B 5/3113* (2013.01); *G11B 5/3163* (2013.01); *H01F 1/0063* (2013.01); *B82Y 25/00* (2013.01); *G11B 5/3116* (2013.01)

(56) References Cited

U.S. PATENT DOCUMENTS

| | | | |
|---|---|---|---|
| 6,835,576 B2 | 12/2004 | Matsuzaki et al. | |
| 7,498,088 B2* | 3/2009 | Kobayashi | B82Y 25/00 428/692.1 |
| 7,839,605 B2* | 11/2010 | Parker | G01R 33/04 360/318 |
| 8,259,410 B1* | 9/2012 | Bai | G11B 5/3136 29/603.07 |
| 8,404,347 B2 | 3/2013 | Li et al. | |
| 8,802,214 B2 | 8/2014 | Liang et al. | |
| 9,478,333 B2* | 10/2016 | Binns | H01F 1/0551 |
| 2004/0115340 A1 | 6/2004 | Griego | |
| 2005/0084668 A1* | 4/2005 | Lamberton | B82Y 25/00 428/328 |
| 2009/0052007 A1 | 2/2009 | Lee et al. | |

* cited by examiner

ELECTROMAGNETIC DATA STORAGE DEVICES HAVING IMPROVED MAGNETIC STRUCTURE

FIELD OF THE INVENTION

The present invention relates to electromagnetic data storage devices, such as hard disk drive devices and the like.

BACKGROUND TO THE INVENTION

Electromagnetic data storage devices are well known, and are a convenient and reliable way to store large amounts of electronic data. The most common type of electromagnetic data storage device is the hard disk drive (HDD) device. An example HDD 1 is shown schematically in FIG. 1 of the accompanying drawings, and includes a spinning disk 2 which carries magnetic material for storing data, a write head 4 for affecting the magnetization direction of a selected portion of the magnetic material, and a read head 4 for detecting the magnetization direction of the portions of the magnetic material in the disk. The write and read heads 4 are typically located on a single actuator device 5 which operates to move the heads 4 across the surface of the disk 2. The heads 4 do not contact the surface of the disk 2, but are separated for the surface by a small air gap caused by air moving with the disk as the disk spins. A detailed explanation of the construction and operation of a hard disk drive device will not be included here for the sake of brevity, since such construction and operation are well known.

There is a continual demand for ever higher storage densities on hard disk drive devices. Such demand is driven, for example, by the increasing desire for use of data-intensive multimedia and video applications on ever smaller devices.

Other mass storage systems with no moving parts, predominantly flash memory, based on non-volatile electronic storage, are available but HDDs remain the main medium for secondary storage on computers and other devices. One reason is the durability of HDD storage to the number of read/write cycles. Data can be written, erased, rewritten over and over indefinitely as long as the disk isn't damaged. All other technologies have a finite number of read/write cycles that guarantee reliable storage. Despite the extra mechanical complication in having a rotating disk within a device, expected improvements in storage density and speed will make HDDs the dominant technology for several years ahead.

The most fundamental limit to data storage on a magnetic data storage medium is the so-called superparamagnetic limit. A piece of magnetic material that is below a critical size (typically around 10 nm) will not hold a permanent magnetization at room temperature. A nanoparticle that is below this critical size is termed superparamagnetic and cannot be permanently magnetized at room temperature. The critical size depends on the magnetic anisotropy of the nanoparticle and decreases with increasing anisotropy. The magnetic film that stores data on an HDD is composed of nanoscale particles and a single data bit is written onto a region containing typically 100 nanoparticles. This is illustrated in FIG. 2 of the accompanying drawings for a single '1' bit written into the magnetic medium of a high-density HDD, which consists of a magnetization reversal. The left part of the Figure shows a measurement of the magnetization pattern on the disk measured by an atomic force microscope and the '1' is highlighted occupying a region of around 100 nm×100 nm. The right part is an illustration of the film that stores the data, consisting of nanoparticles with sizes around 10-20 nm.

In order to increase the density further, this size of the region storing the bits must be reduced and this leads to an impasse. Looking at the possible solutions:

Magnetize a smaller region. This is not possible as reducing the number of particles within a single bit will increase the read back noise. Already the area includes the smallest number of particles that produce an acceptable signal to noise ratio.

Use smaller nanoparticles to decrease the size of the region. This is not possible as the particles will be superparamagnetic.

Use smaller nanoparticles with a higher anisotropy. This is not possible because a higher write field is required to magnetize the medium. Already the highest possible write field is used by flying the write head as close as possible to the medium (12 nm) and the most magnetic material available (FeCo alloy) is coated on the tip of the write head.

Accordingly, the inventors of the current invention have concluded that storage density can be increased if the magnetic field used to write to the magnetic storage material could be increased.

Magnetic materials find widespread use in modern technology and are to be found in nearly all electro-mechanical apparatuses. The performance of magnetic materials in respect of their secondary parameters, such as coercivity and energy product, has improved greatly over the last century. There has nevertheless been little improvement in the most fundamental property, i.e. the saturation magnetization, which determines the strength of the magnetic field produced. The most magnetic material for use in electro-mechanical apparatus, i.e., $Fe_{60}Co_{40}$ alloy, has been available since the 1920s and until recently there has been no material found with a higher magnetization.

The most direct measure of saturation magnetization is the magnetic moment per atom which is specified in Bohr magnetons ($\mu_B$). The magnetic moment for pure Fe is $2.22\mu_B$ per atom whereas for $Fe_{60}Co_{40}$ alloy the magnetic moment is $2.45\mu_B$ per atom. The latter value, i.e., $2.45\mu_B$ per atom, is termed the Slater-Pauling limit and was believed to be the ultimate magnetization available from transition metal alloys. Generally the efficiency of electro-mechanical apparatus improves as the square of the magnetization of the magnetic material. Even small increases in magnetization are therefore valuable especially in green technologies such as electric vehicles and wind turbines.

Upon development in the early 1990s of gas-phase nanoparticle sources capable of depositing nanoparticles with diameters in the range of 0.5 to 5 nm it was discovered that the magnetic moments per atom of Fe, Co and Ni nanoparticles with diameters no more than about 5 nm are significantly higher than for bulk structures formed from the same material. In view of this, magnetic structures in which nanoparticles of one of Fe and Co are embedded in a matrix of the other of Fe and Co have been developed with such magnetic structures having a magnetization which exceeds the magnetization of $Fe_{60}Co_{40}$ alloy to thereby break the Slater-Pauling limit for the first time. FIG. 3 illustrates the formation of one such magnetic structure. As shown in FIG. 3 a magnetic structure 10 is formed by co-deposition on a substrate 12 of Fe nanoparticles 14 from a cluster source 16 and of Co matrix material 18 from a Molecular Beam Epitaxy (MBE) source 20. Co-deposition of Fe nanoparticles and Co matrix material results in a structure in which Fe nanoparticles are distributed through and embedded in the Co matrix. According to an alternative approach a magnetic structure in which Co nanoparticles are distributed through and embedded in an Fe matrix is formed by co-deposition of Co nanoparticles from the cluster source and of Fe matrix material from the MBE source.

Respective magnetic moment per atom measurements for a structure having Fe nanoparticles in a Co matrix and a structure having Co nanoparticles in an Fe matrix are shown in FIG. 4 as a function of the Fe volume fraction. FIG. 4 also shows the Slater-Pauling curve for $Fe_{60}Co_{40}$ alloy as a function of the Fe volume fraction. As can be seen from FIG. 4 the best results are obtained from Co nanoparticles embedded in an Fe matrix which yields values approaching 3 pB per atom. At lower Fe volume fractions the magnetic moment per atom for Fe nanoparticles embedded in a Co matrix exceeds the corresponding value defined by the Slater-Pauling curve. The improvement is seen because the fundamental building blocks of the material already have an enhanced magnetization and also because the matrix itself has a nanostructure which leads to enhanced moments. More specifically there is a higher proportion of atoms at a surface or interface in a nanostructure (approaching 50% in the presently described structure) with each such atom having enhanced spin and orbital moments. On the other hand and as can be seen from the left half of the graph of FIG. 4 the magnetization falls below the Slater-Pauling curve at Fe volume fractions of more than about 20% which is the percolation threshold.

Accordingly, it is desirable to provide a process that can deliver a material with improved magnetic characteristics for use in electromagnetic data storage devices. It is also desirable to provide an electromagnetic data storage device that makes use of such a material.

SUMMARY OF THE PRESENT INVENTION

According to a first aspect of the present invention there is provided an electromagnetic data storage device comprising a data storage medium including a magnetic material, and a write head including an electromagnetic element operable to generate a magnetic field that impinges on a selected portion of the magnetic material of the data storage medium adjacent the write head, so as to affect the magnetization direction of the selected portion of magnetic material, wherein the electromagnetic element of the write head comprises a magnetic structure including a matrix material and a plurality of magnetic nanoparticles held in the matrix material, and an activation element operable to induce a magnetic field in the magnetic structure Such an electromagnetic data storage device may be a hard disk drive device, in which the data storage medium is provided by a rotatable disk which carries the magnetic material, and in which the write head is provided on an actuator for relative movement across the disk.

According to another aspect of the present invention, there is provided a write head device for electromagnetic data storage device which includes a data zo storage medium including a magnetic material, and a write head operable to generate a magnetic field that impinges on a selected portion of the magnetic material of the data storage medium adjacent the write head, so as to affect the magnetization direction of the selected portion of magnetic material, the write head comprising a magnetic structure including a matrix material and a plurality of magnetic nanoparticles held in the matrix material, and an activation element operable to induce a magnetic field in the magnetic structure.

A further aspect of the present invention provides a write head device for an electromagnetic data storage device which includes a data storage medium including a magnetic material, in which the write head device comprises a write head operable to generate a magnetic field that impinges on a selected portion of the magnetic material of the data storage medium adjacent the write head, so as to affect the magnetization direction of the selected portion of magnetic material, in which the write head comprises:

a magnetic structure including a matrix material and a plurality of magnetic nanoparticles held in the matrix material; and an activation element operable to induce a magnetic field in the magnetic structure, wherein each magnetic nanoparticle comprises a core wholly or substantially covered with a shell layer separate to the matrix material, wherein at least one of the matrix material and the core is of ferromagnetic material, wherein the shell layer is of a different material to the core, and wherein the shell layers of the nanoparticles substantially prevent contact between cores of adjacent nanoparticles.

In a process for forming the write head used in an embodiment of the present invention, matrix material and magnetic nanoparticles are deposited to form a matrix on a substrate in which magnetic nanoparticles are embedded.

The matrix material may be a single element, an alloy of more than one element, or a combination thereof. The single element, alloy or combination may include embedded gas atoms and/or molecules.

The magnetic nanoparticles may be elemental nanoparticles of a single element, an alloy of more than one element, or a combination thereof. The single element, alloy or combination may include embedded gas atoms and/or molecules. Example materials for the elemental nanoparticles include iron (Fe) and Cobalt (Co).

Alternatively, the magnetic nanoparticles may be structured nanoparticles having a core of a core material and a shell layer covering the core, the shell layer being of shell material, different to the core material. A structured nanoparticle may be provided with more than one shell layer. The core material may be a single element, an alloy of more than one element, or a combination thereof. The single element, alloy or combination may include embedded gas atoms and/or molecules. The shell layer material may be a single element, an alloy of more than one element, or a combination thereof. The single element, alloy or combination may include embedded gas atoms and/or molecules.

It will be appreciated and understood that reference herein to magnetic nanoparticle(s) or nanoparticle(s) refers to elemental nanoparticles, or to structured magnetic nanoparticles as set out above.

In one example process, the matrix material and the magnetic nanoparticles are deposited on the substrate by operation of a matrix material source and a nanoparticle source respectively. The matrix material and the nanoparticles may be deposited simultaneously, for example by simultaneous operation of the two sources. The source of matrix material may be provided by any suitable process or apparatus, including, for example, a thermal evaporator, such as a Molecular Beam Epitaxy (MBE) apparatus, a sputtering apparatus, a laser ablation apparatus or an arc apparatus. The nanoparticle source may be provided by any suitable process or apparatus, including, for example a thermal gas aggregation apparatus, a sputtering apparatus, a laser ablation apparatus, or an arc apparatus.

A magnetic structure may thereby be formed in which magnetic nanoparticles are distributed through and embedded in the matrix material. The magnetic structure is typically formed as a thin film on the substrate.

For magnetic structures in which structured magnetic nanoparticles are used, covering the core at least in part with a shell layer of material different to that of the core reduces the likelihood of cores coming into contact at nanoparticle volume fractions higher than the percolation threshold. Aggregation of magnetic nanoparticles is therefore reduced and an increase in magnetization seen over structures formed from magnetic nanoparticles lacking the shell layer.

In one example, each magnetic nanoparticle has a diameter not exceeding around 10 nm. The magnetic moment per atom of magnetic nanoparticles of smaller diameters has been found to be significantly higher than for bulk structures formed from the same material. Each magnetic nanoparticle may therefore have a diameter substantially in the range 0.5 nm to 5 nm.

In examples of structured nanoparticles, the shell layer may have a thickness of between around 0.2 nm and 4 nm. In terms of atomic layers, the thickness of the shell layer may be between 1 and 10 atomic layers. The diameter of the core and the thickness of the shell layer may be determined independently from one another. The diameter of the core and the thickness of the shell layer may be determined by the application of and requirements for the structured nanoparticle. The thickness of the shell layer may be related to the diameter of the core. For example, where a core has a diameter of around 5 nm the shell layer may have a thickness of a single atomic layer, which equates to around 0.2 nm.

The shell layer may wholly or substantially cover the core. A surface of the shell layer may define an exterior surface of the magnetic nanoparticle. The matrix material may be of the same material as the shell layer. For example, each magnetic nanoparticle may comprise a Fe core covered at least in part with a layer of Co and the matrix material may be Co. By way of further example, each magnetic nanoparticle may comprise a Co core covered at least in part with a layer of Au and the matrix material may be Au. Use of the same material may reduce the likelihood of the particle cores coming into contact even at volume fractions much higher than the percolation threshold.

For structured nanoparticles, the core may be of a ferromagnetic material. The core material may be a single element, an alloy of more than one element, or a combination thereof. The single element, alloy or combination may include embedded gas atoms and/or molecules. More specifically the ferromagnetic material may be a ferromagnetic transition metal, such as one of Fe, Co and Ni.

The matrix material may be a single element, an alloy of more than one element, or a combination thereof. The single element, alloy or combination may include embedded gas atoms and/or molecules. The matrix material may be a metal and, more specifically, one of a transition metal and a rare earth metal, or an alloy containing a transition metal and/or a rare earth metal, and may include embedded gas atoms and/or molecules.

The core and the matrix material may be of different materials. Where the matrix material is a transition metal, the transition metal may be ferromagnetic or nonmagnetic. The metal layer may be one of a transition metal and a rare earth metal. The metal layer may be a ferromagnetic or nonmagnetic transition metal, or an alloy containing a transition metal, and may include embedded gas atoms and/or molecules.

Each structured magnetic nanoparticle may comprise a core formed from a ferromagnetic transition metal and a shell layer of either a ferromagnetic or nonmagnetic transition metal. The nonmagnetic transition metal may be a Group 11 metal such as gold or silver. Thus, examples of core/shell layer composition may be Fe/Co, Co/Fe, Fe/Ag, Co/Ag, Fe/Au or Co/Au. As mentioned above, use of the same material for the shell layer and the matrix may be advantageous.

Deposition of the magnetic nanoparticles may be by way of vacuum assisted deposition of magnetic nanoparticles in the gas phase and more specifically by way of deposition of a beam of gas-phase magnetic nanoparticles. The process may thus comprise causing a beam of magnetic nanoparticles to impinge upon the matrix as the matrix forms. The beam may be generated by any suitable source, such as a gas phase source, a cluster beam source, such as a gas aggregation source, a sputtering source, or a laser ablation source or an arc source. The gas phase source may be operative to produce a beam of particle cores absent their shell layer.

Where structured nanoparticles are used, a shell layer may be provided on each core as described herein below. The different forms of gas-phase source generate particles in different size ranges when operated at optimum flux (output) levels. A sputter gas aggregation source normally generates particles having a diameter of about 10 nm when operative at an optimum flux level. A thermal gas aggregation source normally generates smaller particles of about 2 nm diameter when operative at an optimum flux level. The thermal gas aggregation source is often preferred for the formation of high performance magnetic structures (so called hipermags).

Deposition of the matrix material may be by way of vacuum assisted deposition of the matrix material in the gas phase and more specifically by way of deposition of a beam of matrix material. It will be appreciated that the beam of matrix material may be an atomic beam, a molecular beam or a mixed beam. The process may thus comprise causing a beam of matrix material to impinge upon the substrate. The beam may be generated by a thermal source, for example a thermal evaporator (such as an MBE source) or by sputtering, by laser ablation, or by an arc process. Forming the magnetic structure by means of a beam of matrix material and a beam of magnetic nanoparticles from a suitable source may confer the advantage of providing for independent control over the grain size and volume fraction in the magnetic structure.

The process may further comprise depositing a shell layer on the core of each nanoparticle, or depositing an additional shell layer on each structured magnetic nanoparticle. Deposition of the shell layer may be by vacuum assisted deposition of shell material vapour. Shell material vapour may therefore be provided in the same vacuum as a source of nanoparticle cores. The shell material vapour may be generated by a thermal source, for example a thermal evaporator (such as an MBE source) or by sputtering, by laser ablation, or by an arc process. The temperature of a thermal source of nanoparticles may be determined by the shell material to be deposited, e.g. 800° C. for silver and 1000° C. for iron. Any gases used in the composition may be introduced at low pressure.

A thickness of the shell layer may be controlled by varying the operating conditions of the shell material source. The shell material source may be disposed between the source of nanoparticle cores and the substrate. In addition, the shell material source may be configured to define a space through which a beam of nanoparticle cores pass, the source being operative to form a vapour of shell material in the space, such that the vapour impinges upon a surface of each particle core. The shell material source may be configured to surround the beam of particle cores. The shell material source may therefore provide for improved coverage of the whole surface of the particle cores. The shell material source may, for example, define a tube through which the beam of particle cores passes. The process may further comprise accelerating a beam of magnetic nanoparticles before their deposition onto the matrix. Acceleration may be after deposition of a shell layer. Acceleration may be achieved by means of apparatus which is configured to interact with the beam of magnetic nanoparticles, for example using electromagnetic techniques.

Each magnetic nanoparticle may comprise a plurality of shell layers over the core. The shell layers may be of the same material as each other or one another or different material to each other or one another. The process may therefore comprise a deposition step for each shell layer. Deposition of each shell layer may be by vacuum assisted deposition from a thermal evaporator as described above. Alternatively, different shell materials may require different deposition techniques, and each may be provided. The plural shell material sources may be disposed in line whereby, for example, a first source provides for deposition of a first shell layer and a second source provides for deposition of a second shell layer over the first shell layer. Subsequent shell layers may be deposited on the previous shell layer by respective sources.

The heavy rare earth metals have much higher magnetic moments than transition metals. For example the magnetic moment of Dy reaches $10\mu_B$ per atom. Generally rare earth metals have low Curie temperatures. For most rare earth metals this Curie temperature is below room temperature. In addition, the magnetic hardness of such materials is relatively high, which requires very high magnetic fields to achieve saturation. Incorporation of transition metals raises the Curie temperature and makes the rare earth and transition metal composition magnetically softer. On the other hand, transition metals may magnetically polarise in the opposite direction to rare earth metals whereby the magnetic moment of the composition rapidly decreases as the volume fraction of the transition metal is increased. This problem may be addressed by providing structured magnetic nanoparticles having the core/shell layer structure described above. Each magnetic nanoparticle may therefore comprise a core formed from a transition metal covered at least in part with a shell layer of an antiferromagnetic material and more specifically an antiferromagnetic transition metal, such as Cr or Mn. The matrix material may be a rare earth metal, such as Dy or Ho. The core may be formed from a ferromagnetic transition metal, such as Fe or CO. The layer of antiferromagnetic material may induce a parallel alignment of the magnetic moment of the rare earth matrix and the transition metal core. The thickness of the layer of antiferromagnetic material may be between 1 and 10 atomic layers. In addition each magnetic nanoparticle may comprise a second shell layer which covers the first shell layer of antiferromagnetic material at least in part, the second shell layer being formed from a rare earth metal. More specifically, the second shell layer and the matrix may be of the same rare earth metal. The thickness of the second shell layer may be between 1 and 10 atomic layers. Provision of the second shell layer may decrease agglomeration of magnetic nanoparticles in the magnetic structure.

DETAILED DESCRIPTION OF EMBODIMENTS OF THE PRESENT INVENTION

Embodiments of the present invention make use of a write head that has an enhanced magnetic structure to provide improved magnetic field properties. Such enhanced properties enable smaller magnetic nanoparticles to be used in a storage medium, which leads to enhanced data storage capacity, as will be described below.

In the following description, reference will be made to magnetic nanoparticles. It is to be understood that these references are to particles that may be elemental magnetic nanoparticles of a single element, an alloy of more than one element, or a combination thereof. The single element, alloy or combination may include embedded gas atoms and/or molecules. Example materials for the elemental nanoparticles include iron (Fe) and Cobalt (Co).

Alternatively, the magnetic nanoparticles may be structured nanoparticles having a core of a core material and a shell layer covering the core, the shell layer being of shell material, different to the core material. A structured nanoparticle may be provided with more than one shell layer. The core material may be a single element, an alloy of more than one element, or a combination thereof. The single element, alloy or combination may include embedded gas atoms and/or molecules. The shell layer material may be a single element, an alloy of more than one element, or a combination thereof. The single element, alloy or combination may include embedded gas atoms and/or molecules.

It will be appreciated and understood that reference herein to magnetic nanoparticle(s) or nanoparticle(s) refers to elemental nanoparticles, or to structured magnetic nanoparticles as set out above.

Figure 5:
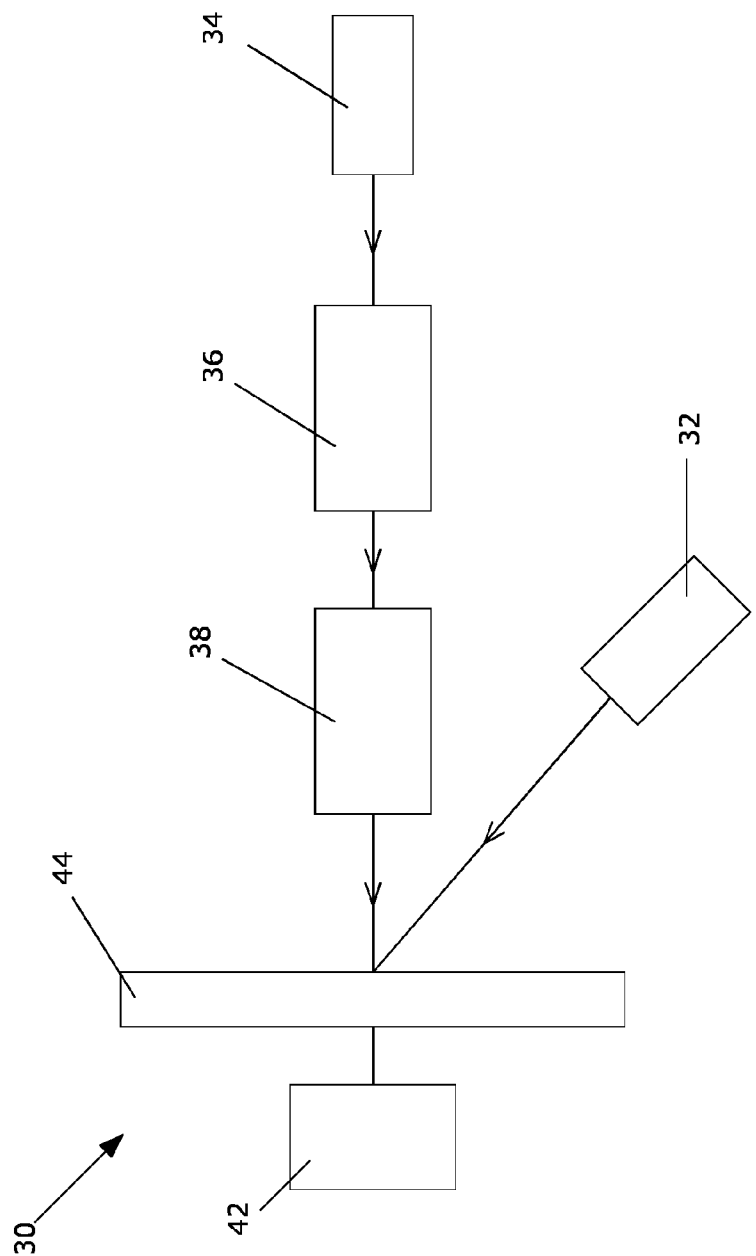
FIG. 5 shows in block diagram form apparatus for forming a magnetic structure.

A method of manufacturing an enhanced magnetic structure will now be described. FIG. 5 shows in block diagram form apparatus 30 for forming a magnetic structure for use in an embodiment of the present invention. The apparatus 30 comprises a matrix material source 32, nanoparticle source 34, a first shell material 36, and a second shell material source 38. The matrix material source 32 may be a thermal evaporator device (such as an MBE device), a sputtering device, a laser ablation device, or an arc device. The nanoparticle source 34 may be a thermal evaporator device, a sputtering device, a laser ablation device, or an arc device. The first and second shell material sources may be a thermal evaporator device, a sputtering device, a laser ablation device, or an arc device.

The apparatus 30 further comprises temperature control apparatus 42 which is operable to control the temperature of a substrate 44 and its environs. The temperature control apparatus may make use of liquid nitrogen, or any other suitable technique. The nanoparticle source 34 and the first and second shell material sources 36, 38 are located and operate in the same vacuum.

As is described further below, the matrix material source 32 is operable to generate a beam of matrix material. The beam of matrix material may be an atomic beam, a molecular beam, or a mixed beam, dependent upon the matrix material. The nanoparticle source 34 is operable at the same time as the matrix material source to generate a beam of nanoparticles. The two beams are deposited simultaneously on the substrate 44 to form a magnetic structure in the form of a thin film matrix formed from deposited matrix material with nanoparticles distributed through and embedded in the matrix. In order to produce a component embodying the present invention, the substrate 44 constitutes a component forming part of an electromagnetic write head for an electromagnetic data storage device.

Figure 6:
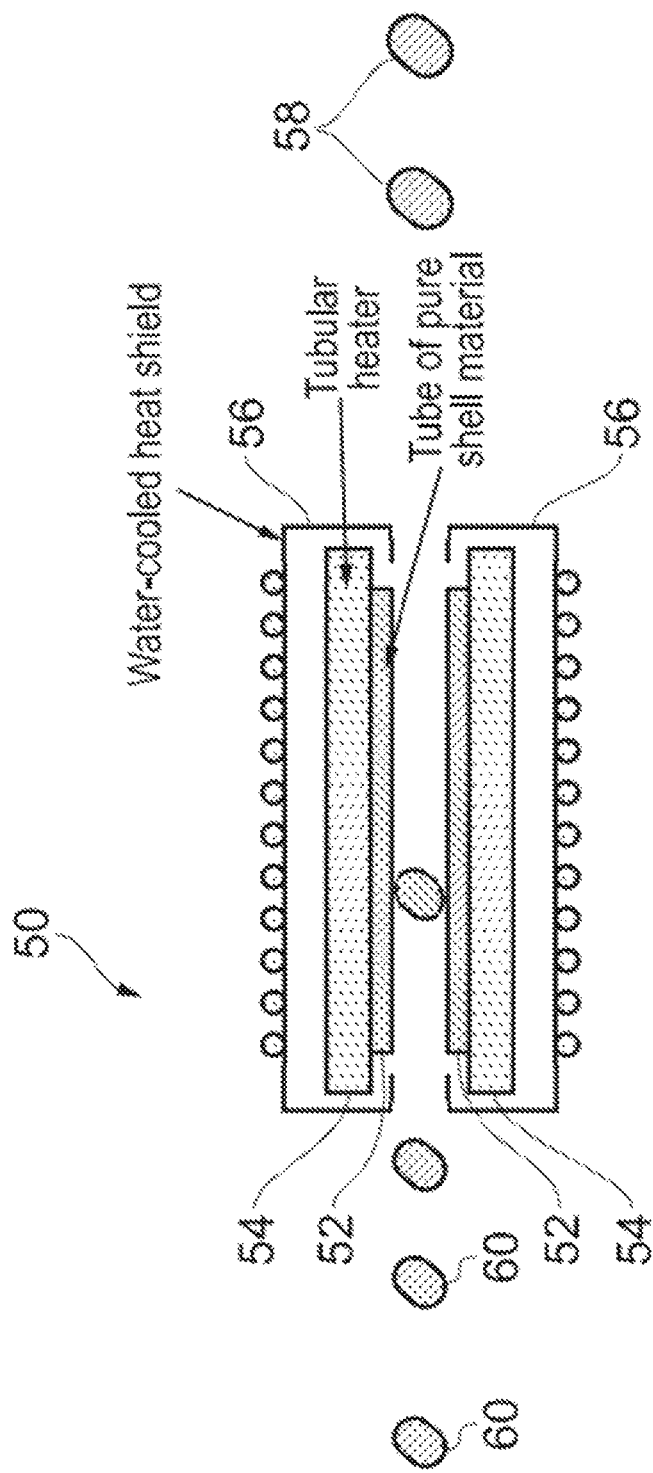
FIG. 6 shows apparatus for coating a core of a nanoparticle.

The first and second shell material sources 36, 38 of FIG. 5 may be of the same type, or may be of different types, dependent upon the material being deposited to form the respective shell layer. FIG. 6 provides a schematic view of an exemplary shell material source 50. The shell material source 50 of FIG. 6 is of generally tubular form such that it defines a bore through which a beam of nanoparticles may pass. The shell material source 50 comprises a tube of pure material 52 which is to be deposited as a layer on each of the nanoparticles passing through the thermal evaporator. The shell material source 50 further comprises a tubular heater 54 which surrounds and is adjacent the tube of pure material 52. A water cooled heat shield 56 surrounds the outwardly directed surface of the tubular heater 54 and the end faces of the tubular heater 54 and the tube of pure material 52. In use, the shell material source 50 operates to vaporise the pure material 52 with the material vapour being present in the bore of the thermal evaporator. A beam of uncoated nanoparticles 58 is received at one end of the bore of the shell material source 50 and on passing through the material vapour in the bore the nanoparticles are coated with a layer of the material. The coated nanoparticles 60 then leave the other end of the bore of the shell material source 50.

In one example of the apparatus 30, nanoparticles are coated with only one layer of material, and the second shell material source 38 of the apparatus of FIG. 5 is either absent or inoperative.

In another example of the apparatus 30, nanoparticles are coated with first and second layers of the same or different material, and the first shell material source 36, 50 comprises a tube of a first material 52 and the second shell material source 38, 50 comprises a tube of the first material or a second different material 52.

In further examples of the apparatus 30, nanoparticles are coated with third and further layers of the same or different material. Accordingly, such examples comprise shell material sources which correspond in number to the number of layers to be deposited on the nanoparticles with the plural shell material source disposed in line such that the beam of nanoparticles can pass in turn through the bore of each of the shell material sources. The exact form of each of the shell material sources depends upon the material being deposited.

A process of forming a magnetic structure on the substrate will now be described with reference to FIGS. 5 and 6. According to this example, only one layer of material is deposited on the nanoparticles. As stated above, the second shell material source 38 of FIG. 5 is therefore either absent or inoperative. The matrix material source 34 generates a beam of nanoparticles of diameters in the range of 0.5 nm to 5 nm. The diameter of the nanoparticles is determined by controlling the operating conditions of the matrix material source 34, for example the power level and the gas pressure therein. The beam of nanoparticles passes through the bore of the first shell material source 36 which comprises a tube 52 of a shell material, for example either Co or Ag. Each nanoparticle is thereby coated with a layer of the shell material to a thickness of between 1 and 10 atomic layers. The operating conditions of the first shell material source 36 are determined by the material to be deposited, and the required thickness of the shell layer concerned. For example, in the case of a thermal evaporator, the operating temperature for Ag is about 800° C.

If it is desired to increase the thickness of the layer the operating temperature need only be increased slightly because vapour pressure is very sensitive to temperature. For example, to double the thickness of an Ag layer it is only necessary to increase the temperature by about 50° C.

Figure 4:
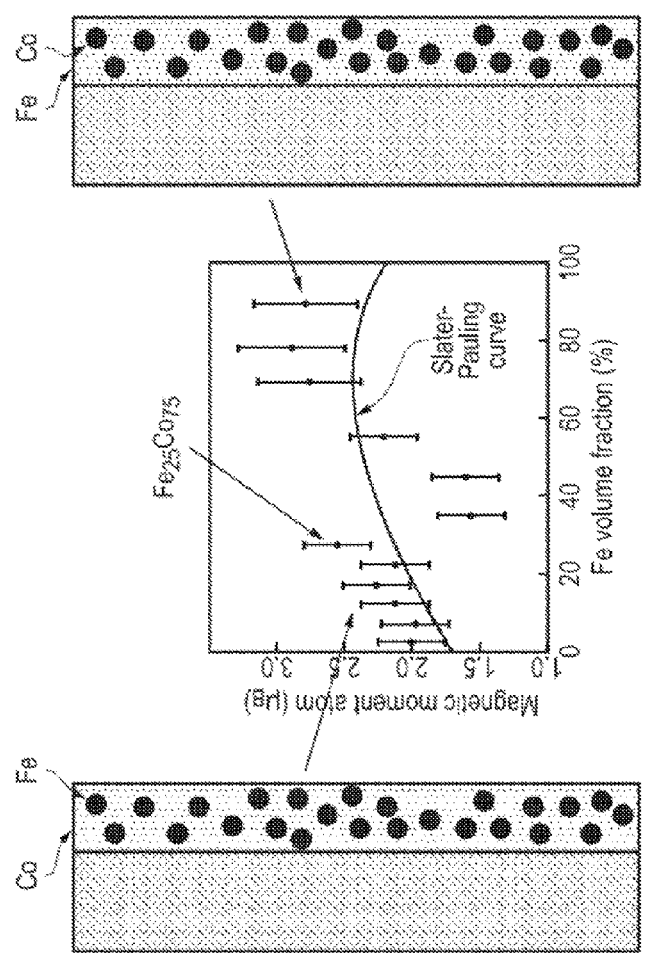
FIG. 4 contains a graph of magnetic moment per atom as a function of the Fe volume fraction for magnetic structures having Fe nanoparticles in a Co matrix and Co nanoparticles in an Fe matrix.

In this example, the matrix material source 32 operates at the same time as the nanoparticle source 34 to generate a beam of matrix material, for example Co or Ag, such that the matrix material beam is of the same material as the coating on the nanoparticles. The matrix material beam and the beam of nanoparticles are deposited simultaneously on the substrate 44 to form a magnetic structure comprising a matrix in which nanoparticles are embedded. The shell on the core decreases the likelihood of the cores coming into contact with one another. By way of example, and to provide a comparison with the performance of uncoated cores as described above with reference to FIG. 4, coated Fe cores having a diameter of 5 nm and a shell layer of a single atomic layer of 0.2 nm, the volume fraction of the core can be increased to 66% without agglomeration compared to about 20% if uncoated Fe nanoparticles are used.

A second example of a process of forming a magnetic structure on the substrate will now be described with reference to FIGS. 5 and 6. According to the second example, two layers of shell material are deposited in turn on the nanoparticles. As stated above, the second shell material source 38 of FIG. 5 is therefore operative. The nanoparticle source 34 is operative to generate a beam of nanoparticles of diameters in the range of 0.5 nm to 5 nm, for example of Co. The diameter of the nanoparticles is determined by controlling the operating conditions of the nanoparticle source 34, for example the power level and/or the gas pressure thereof. The beam of nanoparticles passes through the bore of the first shell material source 36 which comprises a tube 52 of an anti-ferromagnetic material such as Cr or Mn. Each core nanoparticle is thereby coated with a layer of anti-ferromagnetic material to a thickness of between 1 and 10 atomic layers. Then, the nanoparticles pass through the bore of the second shell material source 38, which in one form includes a tube 52 of a rare earth metal such as Ho or Dy. Each nanoparticle is therefore coated with a second layer, of either Ho or Dy, to a thickness of between 1 and 10 atomic layers.

Figure 7:
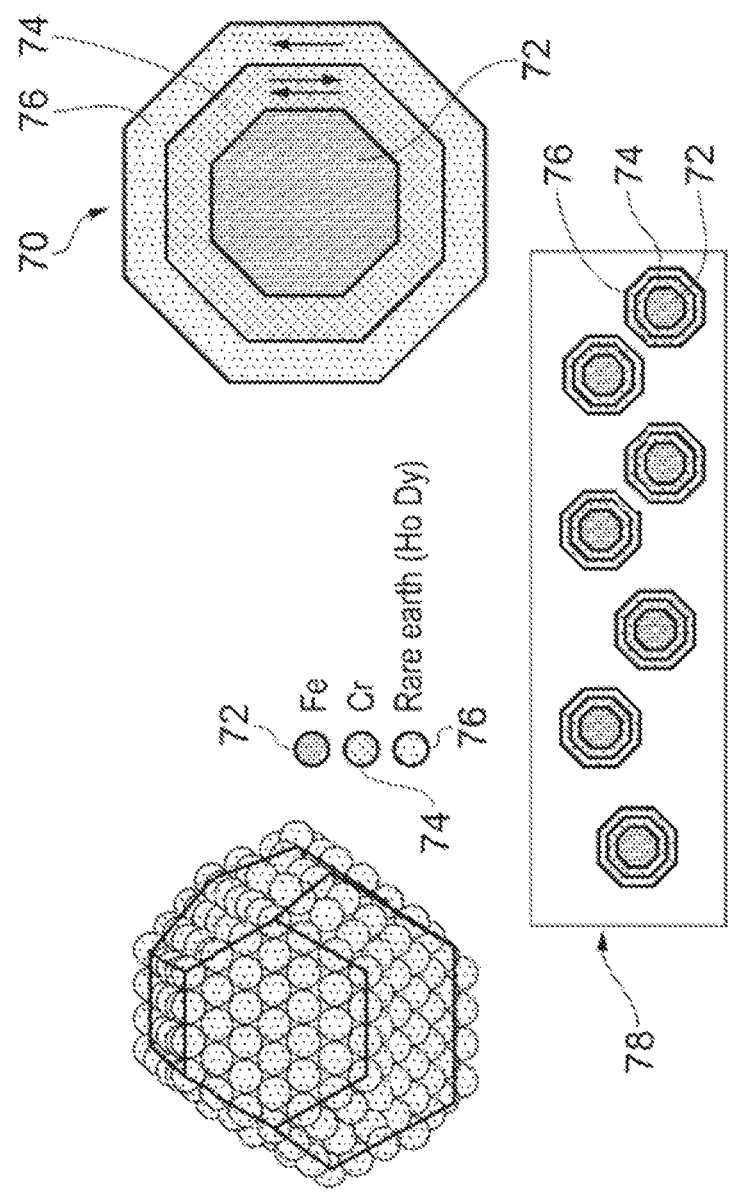
FIG. 7 shows a nanoparticle having an Fe core, a first layer of Cr and a second outer layer of a rare earth metal.

An exemplary structured nanoparticle is shown schematically in FIG. 7 which shows a perspective view of a Co core coated with a layer of each of Cr and a rare earth metal (i.e. Ho or Dy). FIG. 7 also shows a section through a coated nanoparticle 70 with Co forming the core 72, Cr forming a layer immediately over the Co core and either Ho or Dy forming an exterior layer immediately over the Cr layer. FIG. 7 further shows a beam of nanoparticles 78 after deposition of the Cr layer and Ho or Dy layer. The matrix material source 32 is operative at the same time as the nanoparticle source 34 to generate a matrix material beam of either Ho or Dy such that the beam is of the same material as the outer coating on the Co nanoparticles. The matrix material beam and the beam of nanoparticles are deposited simultaneously on the substrate 44 to form a magnetic structure comprising a matrix in which nanoparticles are embedded.

A third example of a process of forming a magnetic structure on the substrate will now be described with reference to FIGS. 5 and 6. According to the third example, only one layer of material is deposited on the nanoparticles. As stated above the second shell material source 38 of FIG. 5 is therefore either absent or inoperative. The nanoparticle source 34 generates a beam of nanoparticles of diameters in the range of 0.5 nm to 5 nm. The nanoparticle may be of iron (Fe). The beam of nanoparticles passes through the bore of the first shell material source 36 which comprises a tube 52 of shell material, for example, Au or Ag. Each nanoparticle is thereby coated with a layer of shell material to a thickness of between 1 and 10 atomic layers. The operating conditions of the first shell material source 36 are determined by the material to be deposited and the required thickness of that material. A molecular beam of water is introduced into the vacuum, and impinges on the substrate 44. The substrate is temperature controlled by the temperature control apparatus 42 whereby the impinging water vapour is deposited as ice on the substrate 44. The ice and the nanoparticles are deposited simultaneously on the substrate 44 to form a magnetic structure comprising an ice matrix in which nanoparticles are embedded. When the magnetic structure is formed the temperature is raised to room temperature to provide a liquid containing the nanoparticles. The liquid is then sprayed onto a desired surface to deposit the nanoparticles upon the surface.

Figure 1:
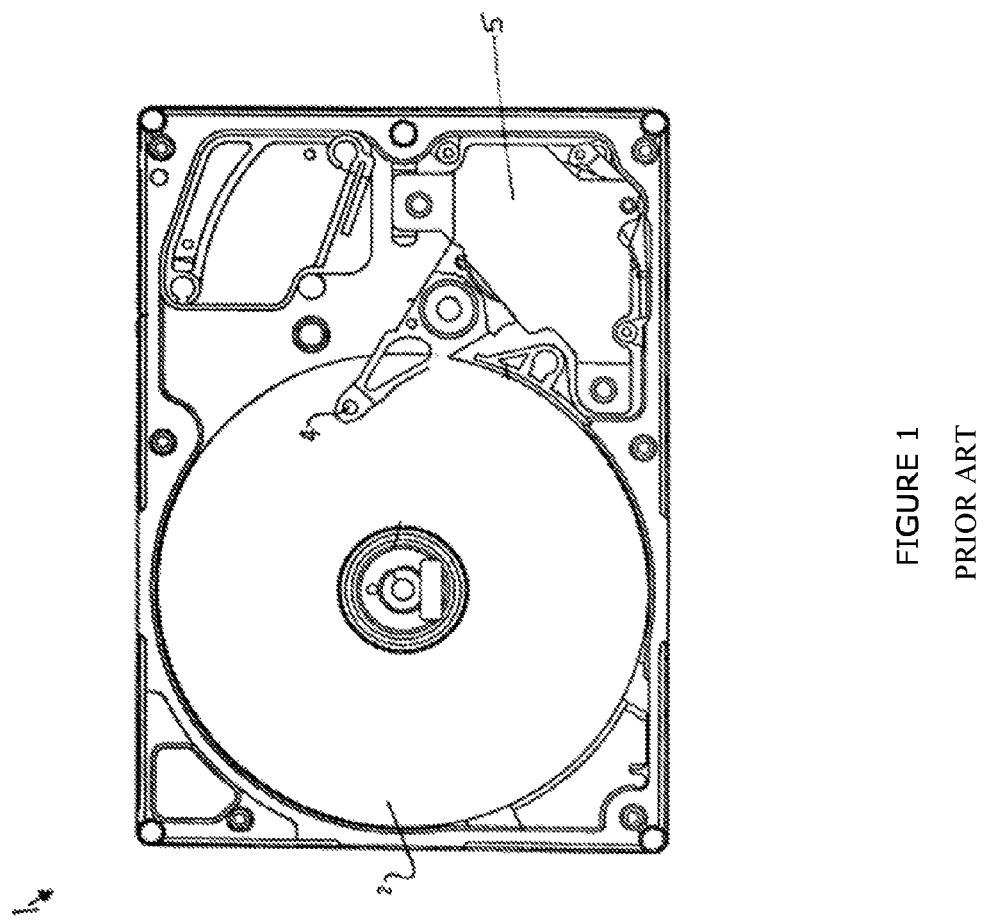
FIG. 1 is a schematic view of a hard disk drive device.
Figure 2:
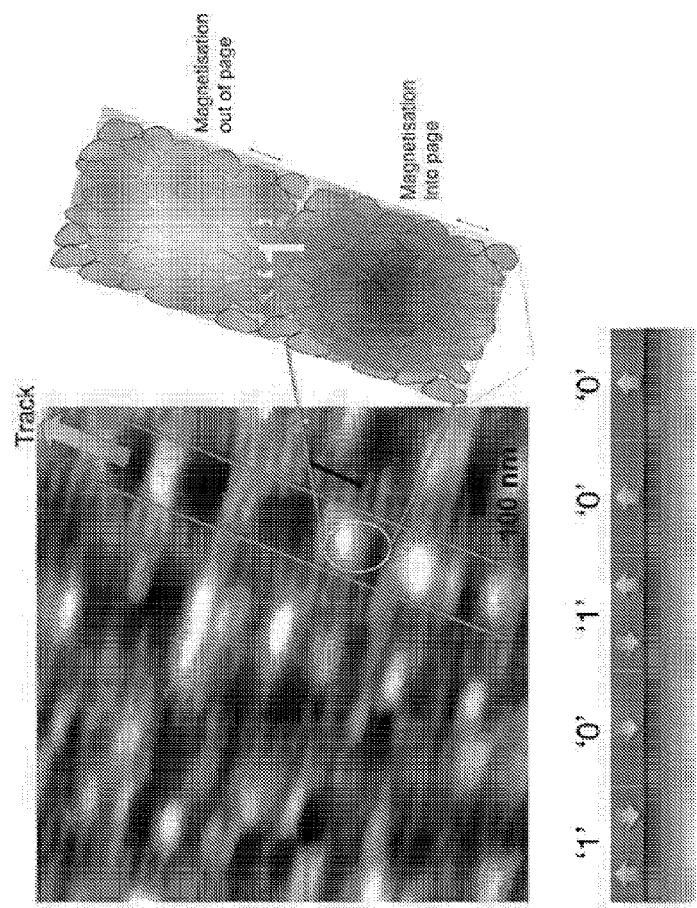
FIG. 2 illustrates data storage on a magnetic storage medium.
Figure 3:
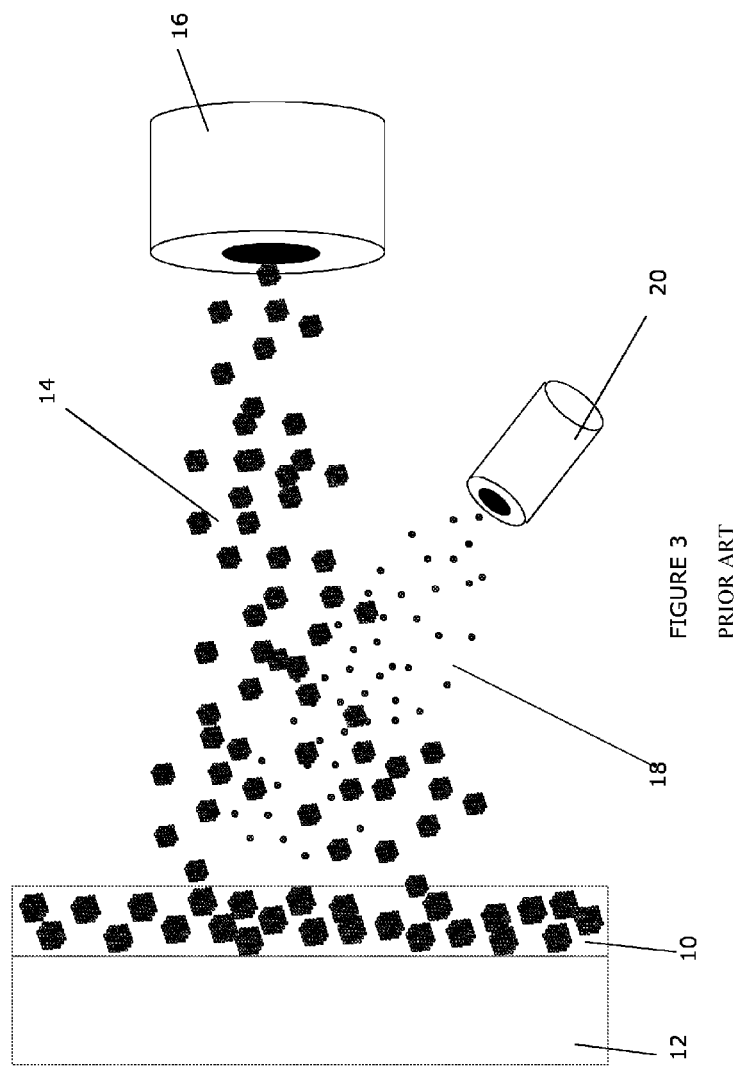
FIG. 3 illustrates the formation of a magnetic structure.

Any of the example processes described above may be used to form a write head for use in a device embodying the present invention. The overall form of an electromagnetic data storage device embodying the present invention is unimportant, save for the requirement to have a magnetic storage medium, and a write head operable to affect the magnetization of portions of the storage medium. A preferred format for an electromagnetic data storage device embodying the present invention is the hard disk drive (HDD), an example of which was described above with reference to FIGS. 1 and 2.

Figure 8:
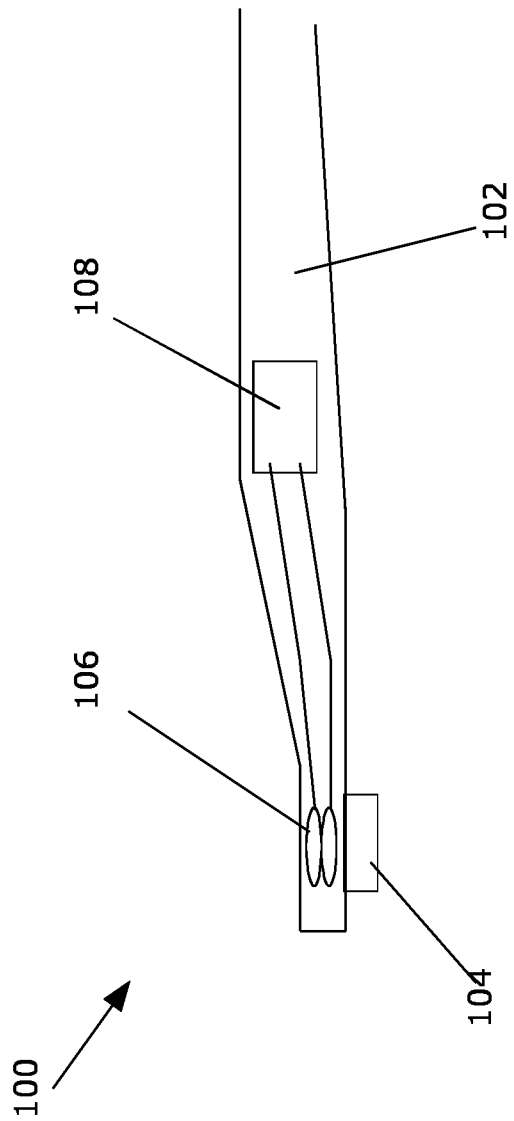
FIG. 8 illustrates schematically a write head for an electromagnetic data storage device embodying the present invention.

FIG. 8 illustrates schematically a data writing device suitable for use in an electromagnetic data storage device. The writing device 100 includes a support arm 102 on which is mounted an electromagnetic write head. The write head comprises a magnetic structure 104 and an activation component 106. The activation component 106 may comprise a coil or other suitable electromagnetic component, and is operable to induce a magnetic field in the magnetic structure 104.

The magnetic structure 104 is formed as described above and includes a substrate, a matrix material, and a plurality of magnetic nanoparticles held in the matrix material. The magnetic nanoparticles may be elemental nanoparticles of a single element, an alloy of more than one element, or a combination thereof. The single element, alloy or combination may include embedded gas atoms and/or molecules. Example materials for the elemental nanoparticles include iron (Fe) and Cobalt (Co).

Alternatively, the magnetic nanoparticles may be structured nanoparticles having a core of a core material and a shell layer covering the core, the shell layer being of shell material, different to the core material. A structured nanoparticle may be provided with more than one shell layer. The core material may be a single element, an alloy of more than one element, or a combination thereof. The single element, alloy or combination may include embedded gas atoms and/or molecules. The shell layer material may be a single element, an alloy of more than one element, or a combination thereof. The single element, alloy or combination may include embedded gas atoms and/or molecules.

This magnetic structure 104 serves to enhance greatly the magnetic field that impinges upon the magnetic material in the storage medium, due to the use of the magnetic nanoparticles described above which provide the write head with a high magnetic moment. Such a material allows the use of smaller magnetic nanoparticles having higher anisotropy in the magnetic storage medium. The use of smaller magnetic nanoparticles in the storage medium enables the storage density to increase, thereby increasing the amount of data that can be stored on a given medium.

This approach provides an improvement on top of any existing envisaged improvement. For example, HDD manufacturers are moving towards heat-assisted magnetic recording (HAMR). This means that higher coercivity nanoparticles can be used in the medium as they are heated during the write cycle, which reduces their coercivity so they can be magnetized by a smaller field. A high moment magnetic material on the write head means that even higher coercivity, and thus smaller nanoparticles, can be used in the medium of a system that already used HAMR.

In one example, a shell layer of each structured magnetic nanoparticle includes a non-magnetic material, a transition metal, an alloy of a transition metal, or a combination thereof.

In another example, a shell layer of each magnetic nanoparticle includes a non-magnetic material, a rare earth metal, an alloy of a rare earth metal, or a combination thereof.

In another example, the shell layer of each magnetic nanoparticle includes a non-magnetic material, a transition metal, a rare earth metal, an alloy of a rare earth metal, or a combination thereof.

In one example, the matrix material includes non-magnetic material, a transition metal, an alloy of a transition metal, a rare earth metal, an alloy of a rare earth metal, or a combination thereof. In one example, the non-magnetic material is water, for example in the form of ice.

The matrix material and/or the material of the magnetic nanoparticles may include embedded gas molecules or atoms.

The invention claimed is:

1. A write head device for an electromagnetic data storage device which includes a data storage medium including a magnetic material, wherein the write head device comprises a write head operable to generate a magnetic field that impinges on a selected portion of the magnetic material of the data storage medium adjacent the write head, so as to affect the magnetization direction of the selected portion of the magnetic material, the write head comprising:

a magnetic structure including a matrix material and a plurality of magnetic nanoparticles held in the matrix material; and an activation element operable to induce the magnetic field in the magnetic structure, wherein each of the plurality of magnetic nanoparticles comprises a core wholly or substantially covered with a shell layer separate from the matrix material, wherein at least one of the matrix material and the core is of ferromagnetic material, wherein the shell layer is of a different material than the core, and wherein the shell layer of the plurality of magnetic nanoparticles substantially prevent contact between the cores of adjacent nanoparticles.

2. The write head device of claim 1, wherein the shell layer of each of the plurality of magnetic nanoparticles comprises a single element, an alloy of two or more elements, or a combination thereof.

3. The write head device of claim 1, wherein the core of each of the plurality of magnetic nanoparticles comprises a single element, an alloy of two or more elements, or a combination thereof.

4. The write head device of claim 1, wherein the core of each of the plurality of magnetic nanoparticles comprises a ferromagnetic material.

5. The write head device of claim 4, wherein the ferromagnetic material comprises a ferromagnetic transition metal, an alloy of a ferromagnetic transition metal, or a combination thereof.

6. The write head device of claim 1, wherein the matrix material comprises the same material as the shell layer of each of the plurality of magnetic nanoparticles.

7. The write head device of claim 1, wherein the shell layer of each of the plurality of magnetic nanoparticles comprises a non-magnetic material, a transition metal, an alloy of a transition metal, or a combination thereof.

8. The write head device of claim 1, wherein the shell layer of each of the plurality of magnetic nanoparticles comprises a non-magnetic material, a rare earth metal, an alloy of a rare earth metal, or a combination thereof.

9. The write head device of claim 1, wherein the shell layer of each of the plurality of magnetic nanoparticles comprises a non-magnetic material, a transition metal, a rare earth metal, an alloy of a rare earth metal, or a combination thereof.

10. The write head device of claim 1, wherein the matrix material comprises a non-magnetic material, a transition metal, an alloy of a transition metal, a rare earth metal, an alloy of a rare earth metal, or a combination thereof.

11. An electromagnetic data storage device comprising:
a data storage medium including a magnetic material; and
a write head device having a write head operable to generate a magnetic field that impinges on a selected portion of the magnetic material of the data storage medium adjacent the write head, so as to affect the magnetization direction of the selected portion of the magnetic material, the write head comprising:
a magnetic structure including a matrix material and a plurality of magnetic nanoparticles held in the matrix material; and
an activation element operable to induce a magnetic field in the magnetic structure,
wherein each of the plurality of magnetic nanoparticles comprises a core wholly or substantially covered with a shell layer separate from the matrix material to substantially prevent contact between the cores of adjacent nanoparticals,
wherein at least one material of the matrix material or the core is of a ferromagnetic material, and
wherein the shell layer is of a different material than the core.

12. The electromagnetic data storage device of claim 11, wherein the electromagnetic data storage device is a hard disk drive device, the data storage medium is provided by a rotatable disk which carries the magnetic material, and the write head is provided on an actuator for relative movement across the disk.

13. The electromagnetic data storage device of claim 11, wherein the core of each of the plurality of nanoparticles is of a ferromagnetic material, the ferromagnetic material comprising a ferromagnetic transition metal, an alloy of a ferromagnetic transition metal, or a combination thereof.

14. The electromagnetic data storage device of claim 11, wherein the matrix material is of the same material as the shell layer of each of the plurality of magnetic nanoparticles.

15. The electromagnetic data storage device of claim 11, wherein the shell layer of each of the plurality of magnetic nanoparticles comprises a nonmagnetic material, a transition metal, an alloy of a transition metal, a rare earth metal, an alloy of a rare earth metal, or a combination thereof.

16. The electromagnetic data storage device of claim 11, wherein the matrix material comprises a non-magnetic material, a transition metal, an alloy of a transition metal, a rare earth metal, an alloy of a rare earth metal, or a combination thereof.

17. The electromagnetic data storage device of claim 1, wherein the at least one material of the matrix material and each of the plurality of magnetic nanoparticles includes embedded gas molecules or atoms.

18. A write head device for an electromagnetic data storage device which includes a data storage medium including a magnetic material, wherein the write head device comprises a write head operable to generate a magnetic field that impinges on a selected portion of the magnetic material of the data storage medium adjacent the write head, so as to affect the magnetization direction of the selected portion of the magnetic material, the write head comprising:
a magnetic structure including a matrix material and a plurality of magnetic nanoparticles held in the matrix material; and
an activation element operable to induce the magnetic field in the magnetic structure,
wherein each of the plurality of magnetic nanoparticles comprises a core wholly or substantially covered with a shell layer separate from the matrix material, the shell being formed of a material that is different than the core and formed to substantially prevent contact between the cores of adjacent nanoparticles, the shell layer including a material selected from a nonmagnetic material, a transition metal, an alloy of a transition metal, a rare earth metal, an alloy of a rare earth metal, or a combination thereof;
wherein the core of each of the plurality of nanoparticles is formed of a material selected from a ferromagnetic material, the ferromagnetic material including a ferromagnetic transition metal, an alloy of a ferromagnetic transition metal, or a combination thereof,
wherein at least one material of the matrix material is of a ferromagnetic material, selected from a non-magnetic material, a transition metal, an alloy of a transition metal, a rare earth metal, an alloy of a rare earth metal, or a combination thereof, and
wherein at least one material of the matrix material and each of the plurality of magnetic nanoparticles includes embedded gas molecules or atoms.

* * * * *